Nov. 15, 1927. 1,649,689
M. HASAIT
MEANS FOR REPRESENTING IN OPTICAL WAY SCENERY AND
OTHER OBJECTS IN STAGES OR THE LIKE
Filed Dec. 24, 1921 2 Sheets-Sheet 1

Inventor
M. Hasait,
By Marks&Clerk
Attys.

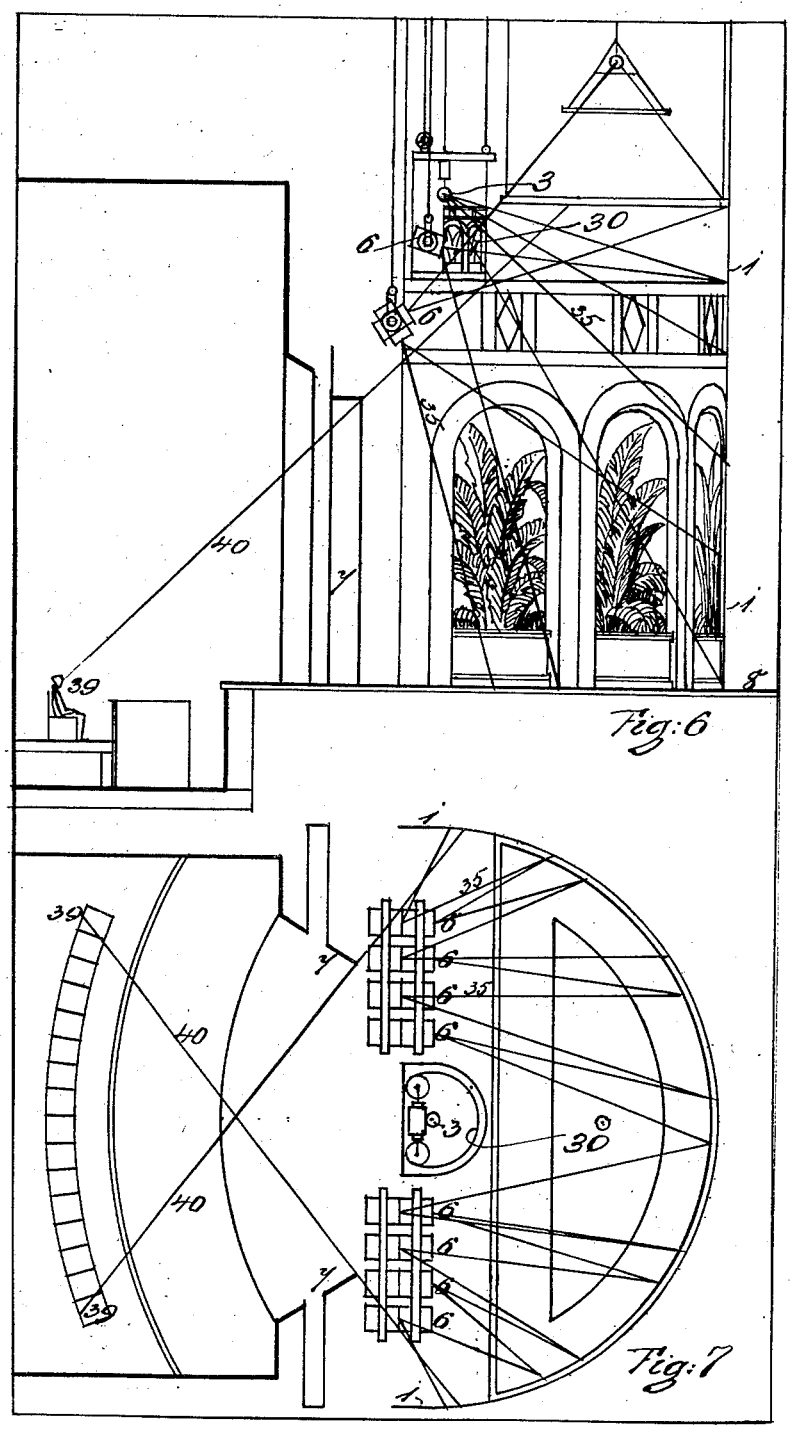

Patented Nov. 15, 1927.

1,649,689

UNITED STATES PATENT OFFICE.

MAX HASAIT, OF DRESDEN, GERMANY, ASSIGNOR TO AKTIEBOLAGET ARS., OF STOCKHOLM, SWEDEN, A CORPORATION.

MEANS FOR REPRESENTING IN OPTICAL WAY SCENERY AND OTHER OBJECTS IN STAGES OR THE LIKE.

Application filed December 24, 1921, Serial No. 524,637, and in Sweden August 22, 1921.

This invention relates to means for representing in optical way scenery and other objects in stages or the like by the aid of colored shadows thrown upon curtains, hangings or the like.

To this end, shadow objects or surfaces are used, which are partly translucent. Behind said objects a powerful white or coloured source of light is placed, which throws the shadows of the objects on a translucent screen placed between the spectators and the shadow objects. Through the covering of the light at the opaque objects cores of shadows will arise, which to begin with appear as dark shadows on the translucent wall. The translucent parts of the shadow objects are produced by different layers of gauzes or similar material, a greater or smaller number of such layers being used according to the desired strength of the shadow. Through the difference of said shadows a sharp picture will appear on the translucent wall. Then the said cores of shadows are colored from before or from behind by means of colored sources of light directed to the said cores of shadows. Besides, the colored shadows of the rear sources of light are colored by means of other sources of light. By this arrangement a colored picture will appear, which has the advantage over the painted decorations, hitherto commonly used, that its colors may be changed at any time desired. However, not only the colors may be changed, but also the forms of the shadow objects by means of mechanical alteration of said objects, such alteration being obtained by flaps, which to begin with cover the cores of shadows and, when swung out, perform new forms at the shadows.

The accompanying drawings illustrate several embodiments of the invention.

Figure 1:
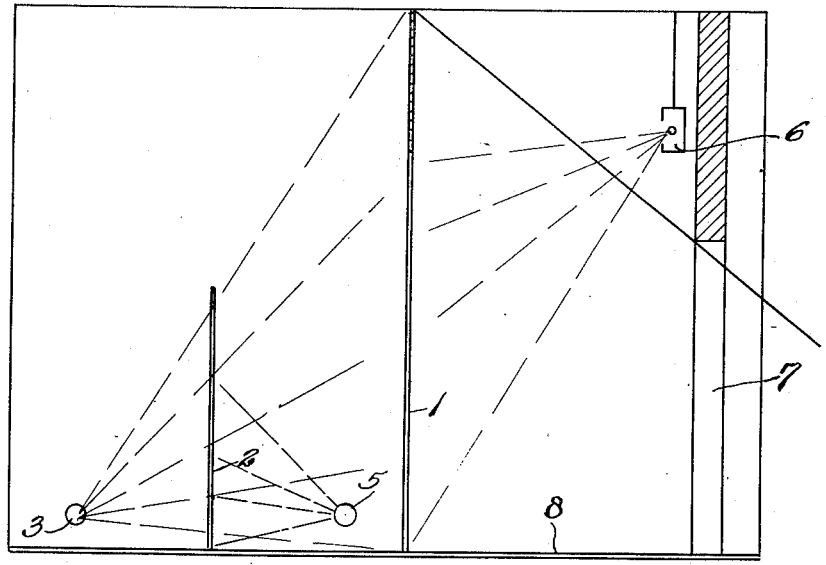
Figure 2:
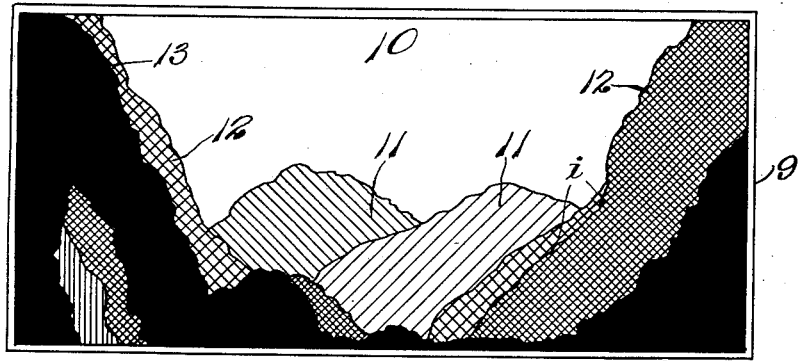
Figure 3:
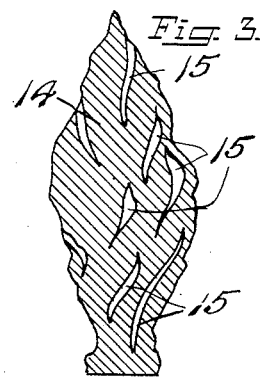
Figure 4:
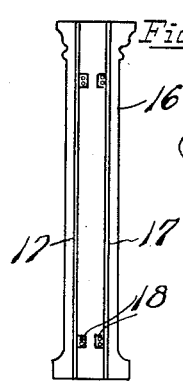
Figure 5:
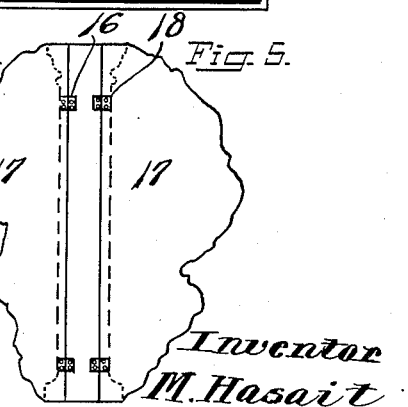

In the drawings, Fig. 1 represents a longitudinal section of part of a stage of a theatre or the like. Fig. 2 shows a mountain decoration produced according to the invention. Figs. 3 to 5 show different forms of shadow objects. Figures 6 and 7 illustrate the invention as applied to curved back screens.

Referring to Fig. 1, representing a portion of the stage of a theatre or the like in longitudinal section, the stage is bounded by the floor 8, and the scene opening 7. Placed on the stage is a translucent wall 1 which may be plane or cylindrical or curved in any other manner. The wall 1 consists of linen, shirting or the like and is suspended without plaits in the manner commonly used in case of back-scenes or rounded curtains. Placed behind the wall 1 is a powerful source of light 3 whose luminous intensity is adjustable and the color of which can be varied for instance by means of filters which may be one-colored or many-colored in zones with graduation of the colors shading off into each other. Placed between the wall 1 and the source of light 3 are objects 2, the shadows of which are thrown upon the wall 1. Said shadows are lighted by means of one or more sources of light 6 which also are adjustable and colored, for instance by means of one or many colored filters. According to the relative luminous intensity of the sources of light 3 and 6 their colors will appear more or less on the portions of the wall 1 lighted by the same, said portions thus representing either only the color of the source of light 3 or mixed colors.

The objects 2 may consist of solid bodies or plane surfaces and in the latter case they are suitably parallel to the wall 1. Obviously, the distance between the wall 1 and the sources of light 3 determines the relative size of the shadows and the extension of the sources of light 3 in the space determines the sharpness of the outlines of the shadows.

As stated above, the shadows of the translucent objects may appear in mixed colors from the sources of light 3 or 6. Then, the said picture shows in its translucent parts of the shadow the original color of the filter in front of the source of light. Obviously, in case of opaque objects the colors of the filter are inactive. In coloring the front side of such objects and in lightening the same by white light or in lightening such white front sides by colored light and if said lightening is performed by other sources of light 5 than 3, and 6, the coloring of the shadows may be still more varied through the reflex of said light on the wall 1.

It is now to be described the producing of a mountain-landscape according to Fig. 2. To begin with, a rectangular frame 9 of wood is made and a thin gauze 10 is stretched over said frame. On this layer of gauze a second layer of gauze having the form shown at 11 is laid and represents the remotest part of the mountain. By cutting out and securing further layers of gauze the parts 12 of the mountain is obtained and then opaque parts 13, for instance of paper, are secured to the layer 10, so as to form cores of shadows. The objects may be changed as to their form by the application of flaps. The objects 2 may also be made from solid material, such as wood, and be provided with transparent slots 15 in the form of light lines or the like according to Fig. 3, which shows a bush 14. By this the appearance of the colors of the shadows will be improved. If the shadow is to be changed, the object may be provided with flaps, as shown in Figs. 4 and 5, where a column is to be changed to a bush. To this end the column 16 is provided with two flaps 17 secured to the column by means of hinges 18, the flaps being swung out to the position shown in Fig. 5 when forming the bush. If desired, the said shadows may also be produced on an opaque white surface, for instance a curved curtain or a stationary back-scene, as shown in Figs. 6 and 7. In said figures $i$ is the curved white surface on which the shadows are to be produced, 8 is the stage floor, on which the said surface $i$ rests. 7 is the proscenium opening, 39 a spectator and 40 the highest line of vision. 30 is the apparatus for producing the shadows, arranged in front of the source of light 3 for throwing a shadow on the white surface $i$. The coloring of the shadows is obtained by the sources of light 3 and 6, as indicated by the rays 35.

The shadows may also be changed as to their location and size on the wall 1, Fig. 1, by moving the objects 2 or the source of light 3, which arrangement may be used in performing moving sceneries, spirit apparitions, moving ships and the like. If persons are to walk over the scene, this may be performed by any scenery mounted in front of the wall 1, the persons, then, walking from the room between said scenery and the wall 1. The same action may be performed by openings in the wall 1 hidden by wall behind the openings, whereby deep shadows will occur, which may be lighted and colored by the sources of light 6 in any suitable manner.

What I claim as new and desire to secure by Letters Patent of the United States is:—

1. In means for representing optically, scenery and other objects on a stage, the combination of a translucent screen located on said stage, a source of light arranged at one side of said screen and adjustable as to its intensity of light and color, a number of objects each comprising a plurality of differently shaped superimposed layers of translucent material so arranged between the light source and screen as to produce scenic effects due to the varying translucencies, the shadows of which are thrown by means of the source of light upon the said screen, and at least one further colored and adjustable source of light arranged to illuminate the screen and the shadows on the same.

2. In means for representing optically, scenery and other objects on a stage, the combination of a translucent screen located on said stage, a source of light arranged at one side of said screen and adjustable as to its intensity of light and color, a number of partly opaque objects each comprising a plurality of differently shaped superimposed layers of translucent material so arranged between the light source and screen as to produce scenic effects due to the varying translucencies, the shadows of which are thrown by means of the source of light upon the said screen, and at least one further colored and adjustable source of light arranged to illuminate the screen and the shadows on the same.

3. In means for representing optically, scenery and other objects on a stage, the combination of a translucent screen located on said stage, a source of light arranged at one side of said screen and adjustable as to its intensity of light and color, a number of partly colored objects each comprising a plurality of differently shaped superimposed layers of translucent material so arranged between the light source and screen as to produce scenic effects due to the varying translucencies, the shadows of which are thrown by means of the source of light upon the said screen, and at least one further colored and adjustable source of light arranged to illuminate the screen and the shadows on the same.

4. In means for representing optically, scenery and other objects on a stage, the combination of a translucent screen located on said stage, a source of light arranged at one side of said screen and adjustable as to its intensity of light and color, a number of partly opaque objects each comprising a plurality of differently shaped superimposed layers of translucent material so arranged between the light source and screen as to produce scenic effects due to the varying translucencies, the shadows of which are thrown by means of the source of light upon the said screen, and at least one further colored and adjustable source of light arranged to illuminate the screen and the shadows on the same, and at least a still further source of light located between said screen and said objects and illuminating the surface of the objects facing the screen.

5. In means for representing optically, scenery and other objects on a stage, the combination of a translucent screen located on said stage, a source of light arranged at one side of said screen and adjustable as to its intensity of light and color, a number of objects each comprising a plurality of differently shaped superimposed layers of translucent material so arranged between the light source and screen as to produce scenic effects due to the varying translucencies, the shadows of which are thrown by means of the source of light upon the said screen, and at least one further colored and adjustable source of light arranged to illuminate the screen and the shadows on the same, some of said objects being provided with movable flaps to permit transformation of the same.

6. In the optical representation of scenery and other objects on a stage, the combination of a translucent wall on said stage, an object comprising a plurality of differently shaped superimposed layers of translucent material, and a light source arranged to throw the shadow of said object on said wall to produce scenic effects due to the varying translucencies of the object.

7. In the optical representation of scenery and other objects on a stage, the combination of a wall on said stage, an object comprising a plurality of differently shaped superimposed layers of translucent material, and a light source arranged to throw the shadow of said object on said wall to produce scenic effects due to the varying translucencies of the object.

In testimony whereof I affix my signature.

MAX HASAIT.